US012717943B2

(12) United States Patent
Rodriguez et al.

(10) Patent No.: US 12,717,943 B2
(45) Date of Patent: Aug. 25, 2026

(54) SECURE CAPTURE OF A DATA ITEM AT A CLIENT DEVICE

(71) Applicant: Yoti Holding Limited, London (GB)

(72) Inventors: Francisco Angel Garcia Rodriguez, London (GB); Miguel Jimenez, London (GB)

(73) Assignee: Yoti Holding Limited, London (GB)

( * ) Notice: Subject to any disclaimer, the term of this patent is extended or adjusted under 35 U.S.C. 154(b) by 35 days.

(21) Appl. No.: 18/744,425

(22) Filed: Jun. 14, 2024

(65) Prior Publication Data

US 2024/0419824 A1 Dec. 19, 2024

Related U.S. Application Data

(63) Continuation of application No. PCT/EP2022/054491, filed on Feb. 23, 2022.

(30) Foreign Application Priority Data

Dec. 15, 2021 (GB) ..................................... 2118177

(51) Int. Cl.
*G06F 21/62* (2013.01)
*G06F 21/60* (2013.01)

(52) U.S. Cl.
CPC ........ *G06F 21/6209* (2013.01); *G06F 21/602* (2013.01); *G06F 21/606* (2013.01)

(58) Field of Classification Search
CPC ... G06F 21/6209; G06F 21/606; G06F 21/602
See application file for complete search history.

(56) References Cited

U.S. PATENT DOCUMENTS 8,965,066 B1 * 2/2015 Derakhshani ........ G06V 40/193 382/209
9,537,654 B2 * 1/2017 Botero Montano .... G06F 21/31
9,847,990 B1 * 12/2017 de Boursetty ........ H04L 9/3236
11,122,079 B1 * 9/2021 Aloisio ............... H04L 63/0407
2004/0046641 A1 * 3/2004 Junqua ................ H04L 63/0861 340/5.82

(Continued)

FOREIGN PATENT DOCUMENTS

EP 3258407 A1 12/2017
WO WO 2019/125182 A1 6/2019

OTHER PUBLICATIONS

Combined Search and Examination Report in GB Patent Application No. 2118177.1, dated Jun. 15, 2022, in 6 pages.

(Continued)

*Primary Examiner* — Vance M Little

(74) *Attorney, Agent, or Firm* — Knobbe, Martens, Olson & Bear, LLP

(57) ABSTRACT

An obfuscated code package is deployed to a client device to effect secure capture of a data item at the client device. The obfuscated code package has a cryptographic key embedded therein or derivable therefrom, and is configured, when run on a client device, to cause the client device to cause the client device to capture a data item according to the capture algorithm, generate a secure message according to the signing algorithm comprising the data item captured at the client device. The cryptographic key is used to generate the secure message.

20 Claims, 6 Drawing Sheets

(56) References Cited

U.S. PATENT DOCUMENTS

2011/0302410 A1 * 12/2011 Clarke .................. H04L 9/0872
380/46

OTHER PUBLICATIONS

International Search Report and Written Opinion in PCT/EP2022/054491, dated Sep. 5, 2022, in 14 pages.
Meng-Day (Mandel} Yu et al: "Pervasive, Dynamic Authentication of Physical Items", Communications of the ACM, Association for Computing Machinery, Inc, United States, vol. 60, No. 4, Mar. 24, 2017 (Mar. 24, 2017}, pp. 32-39, XP058326509, ISSN: 0001-0782, DOI:10.1145/3024922.
Shi Yang et al: "Obfuscatable Anonymous Authentication Scheme for Mobile Crowd Sensing", IEEE Systems Journal, IEEE, US, vol. 13, No. 3, Sep. 1, 2019 (Sep. 1, 2019}, pp. 2918-2929, XP011742033, ISSN: 1932-8184, DOI: 10.1109/JSYST.2018.2881711 [retrieved on Aug. 23, 2019].

* cited by examiner

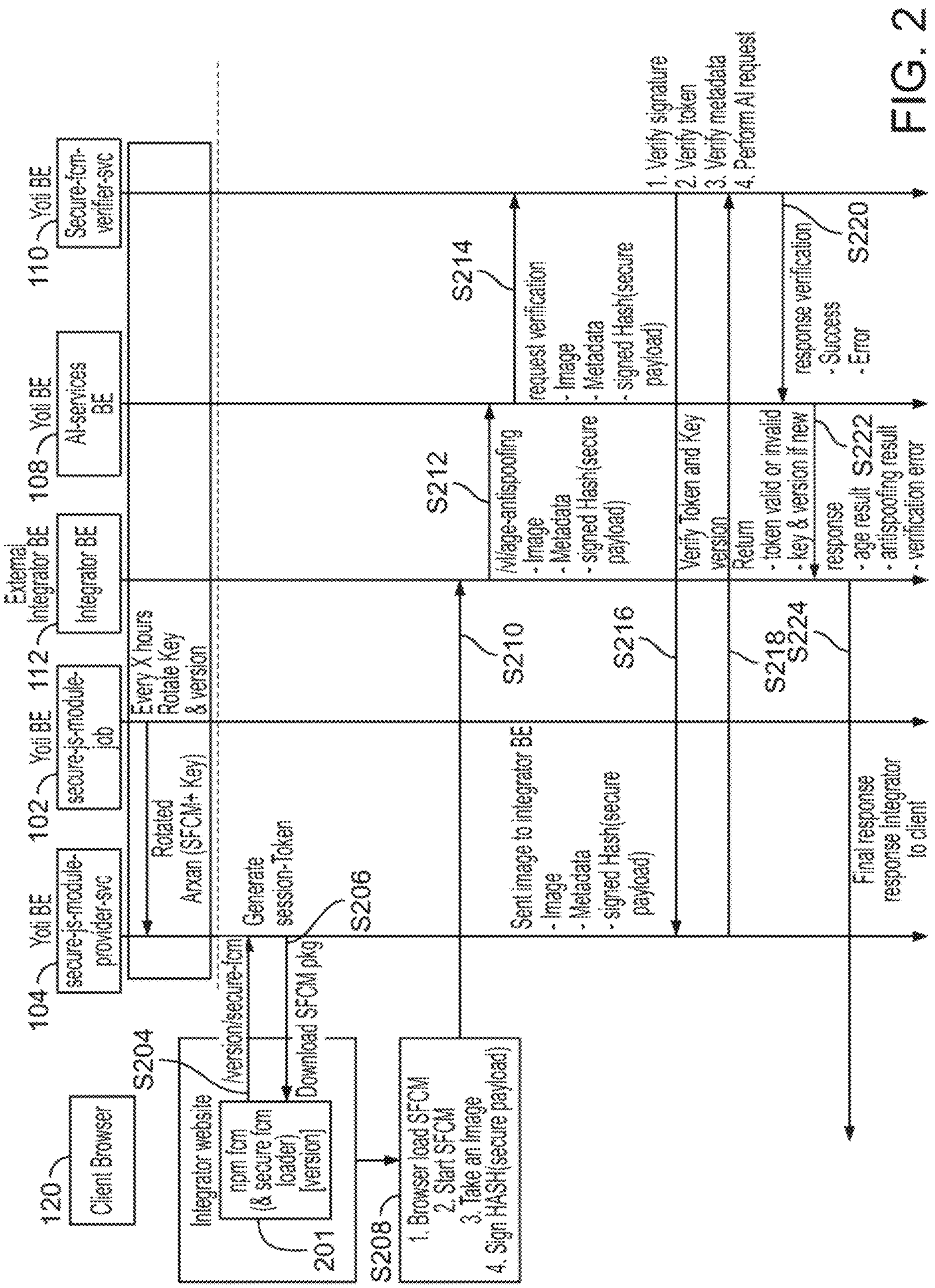

120
Client Browser
Integrator website
npm fcm
(& secure fcm loader)
[version]
201
S204
/version/secure-fcm
Download SFCM pkg
S206
104
Yoti BE
secure-js-module-provider-svc
102
Yoti BE
secure-js-module-job
112
External Integrator BE
Integrator BE
108
Yoti BE
AI-services BE
110
Yoti BE
Secure-fcm-verifier-svc
Every X hours
Rotate Key
& version
Rotated
Arxan (SFCM+ Key)
Generate
session-Token
S208
1. Browser load SFCM
2. Start SFCM
3. Take an Image
4. Sign HASH(secure payload)
S210
Sent image to integrator BE
- Image
- Metadata
- signed Hash(secure payload)
S212
/image-antispoofing
- Image
- Metadata
- signed Hash(secure payload)
S214
request verification
- Image
- Metadata
- signed Hash(secure payload)
1. Verify signature
2. Verify token
3. Verify metadata
4. Perform AI request
S216
Verify Token and Key version
S218
Return
- token valid or invalid
- key & version if new
S220
response verification
- Success
- Error
S222
response
- age result
- antispoofing result
- verification error
S224
Final response
response integrator to client
FIG. 2

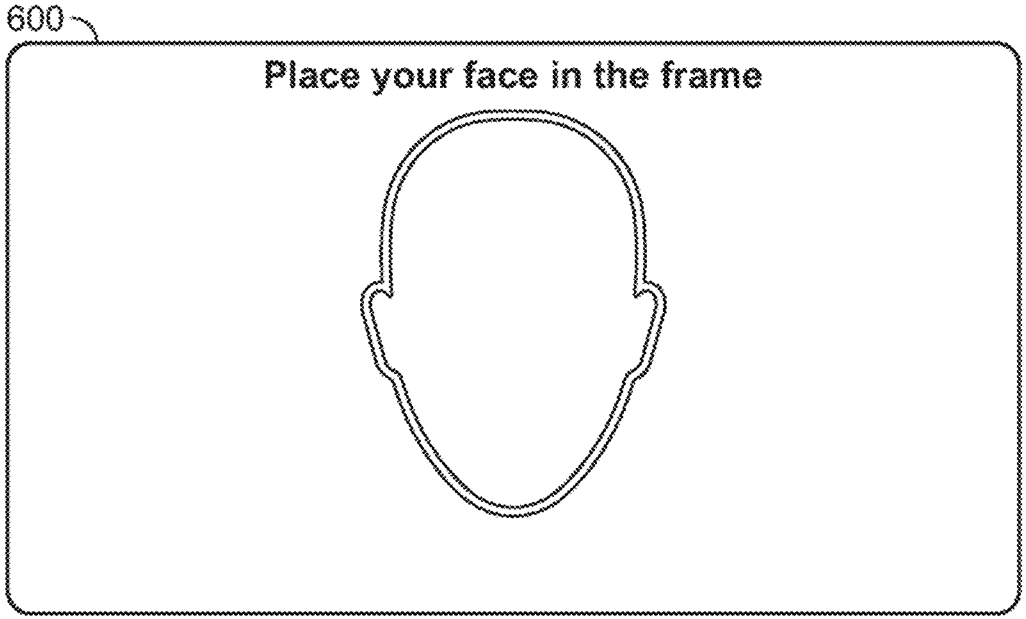
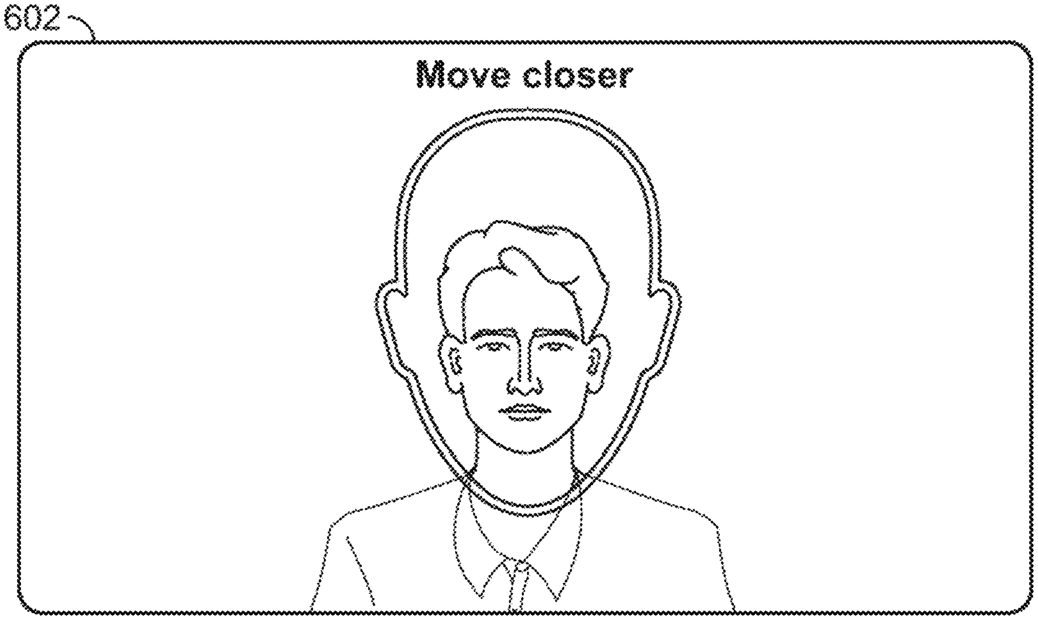
FIG. 6

SECURE CAPTURE OF A DATA ITEM AT A CLIENT DEVICE

TECHNICAL FIELD

The present disclosure pertains to methods, systems and computer programs for effecting capture of a data item at a client device in a secure manner that is robust to spoofing attacks.

BACKGROUND

Digital security, authentication mechanisms and the like are increasingly reliant on the capture of some data item (or data items) at a client device that is submitted in a message to another system (e.g. backend) for validation. For example, in a biometric authentication context, a data item might take the form of a facial image or other biometric. In a digital identity context, a data item might take the form of some identity datum (such as a name, data of birth, nationality or other attribute) captured from a physical document, e.g. by capturing an image of the document or reading the data from an embedded RFID chip (or similar). In such contexts, it is important that the data item is genuine in the sense of having been captured as intended, e.g. from an actual human user of the client device, or an actual physical document in the user's possession.

A spoofing attack refers to a technique whereby an unauthorised entity attempts to "spoof" a device or system by providing falsified input data, typically seeking to gain illegitimate access to some restricted service or function. For example, an online biometric authentication process might involve the capture of facial image (static or video) at a client device and the submission of the facial image to a backend system for biometric authentication. In the absence of adequate safeguards, it would be straightforward for an attacker to modify the steps at the client device so that a pre-captured, pre-recorded or synthetic facial image of another user is submitted to the backend instead, severely undermining the security of the biometric authentication process (which relies on the facial image having been captured from an actual user of the device at that moment in time). In a "replay attack", a valid and genuine message payload is intercepted and reused in future non-genuine attempts. In one form of "injection attack", a message payload is modified with an alternative data item.

Adequate safeguards are needed to reduce a system's exposure to such attacks. Similar considerations apply to other forms of biometric/sensors, and other applications such as visual age estimation (e.g. based on a user's visual facial characteristics). Similarly, an identity verification method might rely on an image or RFID data captured from a physical identity document (e.g. as part of a digital identity validation or enrolment process) and submitted to the backend, to check that the user of the device has possession of the physical document at that point in time. The security of the process is similarly undermined if an attacker can straightforwardly inject or replay other identity data without detection.

One example context is that of a web application hosted in a remote web server and delivered over the Internet to a client device through a web browser interface, the app developer is not afforded the same level of control. The "open" nature of web applications is beneficial in many respects, but it also makes such applications inherently less secure and more vulnerable to attacks by knowledgeable attackers.

SUMMARY

Techniques are provided herein for mitigating the risk of spoofing attacks when capturing a data item at a client device that is submitted in a message for processing, by verifying that a received data item has been captured as intended. The present techniques can be usefully implemented in any capture context, including application environments that are inherently less secure, one example being a web application, in which a capture module is encoded in a scripting language (such as JavaScript) that is provided to a client device and interpreted by a web browser (or other application) executed on the client device. A particular risk in this context is that a knowledgeable attacker, with access to the code of the capture model, can readily see how the capture module interfaces with other components (such as the browser and web server) and use that knowledge to design a targeted spoofing attack. For example, JavaScript—a core web technology widely used to implement client-side web page behaviour—is an interpreted language, designed to be "programmer-friendly", and is therefore inherently more susceptible to reverse-engineering. The same considerations apply more generally to other contexts in which the code of the capture module is distributed in a more programmer-interpretable format (e.g. as script or source code). Moreover, even when code is distributed in machine form (e.g. object or binary code), it may still be interpretable to a sophisticated attacker.

The present techniques address this problem, in part, via code obfuscation. Code obfuscation refers to a class of techniques for modifying an executable such that it is less interpretable to an attacker but remains fully functional. Various code obfuscation techniques exist that can be applied to obfuscate a piece of code (such as script, source code or machine code) in this manner, and these techniques can be a somewhat effective barrier to reverse-engineering.

However, no code obfuscation can ever be sufficient to completely deter a determined and well-resourced attacker. If the code of the capture module were simply obfuscated prior to distribution, this would, for a limited period of time, obscure the mechanics of the capture algorithm, which in turn might make it harder to design an effective attack. However, it has to be assumed that, at a certain point from its initial distribution, the obfuscated code would be reverse engineered, and the benefits of obfuscation would then be lost; obfuscation simply "buys time". One option would be to periodically modify the capture algorithm. However, even then, code obfuscation alone might not be sufficient, because a skilled attacker may be able to design an attack without reverse engineering, by observing the behaviour of the capture module. Mere code obfuscation applied to the capture module cannot provide sufficiently strong guarantees.

A first aspect herein is directed to a computer system for effecting secure capture of a data item at a client device, the computer system comprising: a code builder configured to generate an obfuscated code package, the obfuscated code package embodying, in obfuscated form, a capture algorithm for capturing a data item and a cryptographic algorithm for securing a captured data item; an obfuscated code distributor configured to transmit the obfuscated code package to the client device, the obfuscated code package configured, when run on the client device, to cause the client device to capture a data item according to the capture algorithm, and generate a secure message according to the cryptographic algorithm, using a cryptographic key embedded in the obfuscated code package or derived by the cryptographic algorithm, the secure message comprising the data item captured at the client device; and a verifier configured to receive the secure message comprising the data item, and verify the data item using knowledge of the cryptographic key.

The cryptographic key may be embedded 'directly' in the obfuscated code package (e.g. as value(s) of one or more variables), or indirectly via a key derivation algorithm that forms part of the obfuscated code. Either way, the code obfuscation not only disguises the mechanics of the algorithms but, crucially, also obscures the cryptographic key. In one example, the cryptographic key serves as a signature key used to generate a data item signature included in the secure message. The data item signature protects the integrity of the data item, meaning that an attacker cannot simply modify the data item in the message without invalidating the data item signature (the signature would no longer match the data item). The signature key can only feasibly be obtained by reverse engineering the obfuscated code package. Hence, the integrity of the signature key is guaranteed for as long as it would realistically take to reverse engineer the code. In another example, the cryptographic key serves as an encryption key used to encrypt the data item and the data item is refused if decryption fails.

In the signature example, without the signature mechanism to protect the integrity of the data item, the code obfuscation would be of more limited use, for the reasons discussed above. Moreover, without code obfuscation, it would be straightforward for an attacker to piece of code. In combination, the code obfuscation and signature mechanisms provide far stronger guarantees than either one could provide individually. In the encryption example, the extract a signature key from an obfuscated JavaScript code package or similarly high-level code obfuscation and encryption mechanism combined provide similar guarantees.

In example embodiments, the cryptographic key may have an associated expiration time. The verifier may be configured to determine whether the cryptographic key has expired, and refuse the data item if the cryptographic key has expired or the secure message is invalid (e.g. because the data item signature is invalid or the decryption failed).

The expiration time can be set relative to the initial distribution of the obfuscated code package so that the cryptographic key expires before the obfuscated code package can feasibly be reverse engineered.

The cryptographic key may be a first cryptographic key and the obfuscated code package may be a first obfuscated code package. The code builder may be configured to generate a second obfuscated code package. The first obfuscated code package may have a first obfuscated form that is dependent on the first cryptographic key, and the second obfuscated code package may have a second obfuscated form that is dependent on a second cryptographic key thereof, such that the second cryptographic key is not derivable from the first obfuscated form of the first obfuscated code package.

The second cryptographic key may have a later expiration time than the first cryptographic key.

An obfuscation method can be chosen that is highly sensitive to changes in the input code, in the sense that any small change in the input code causes a dramatic change in the obfuscated code output. In other words, an obfuscation method can be chosen that provides a highly non-linear transformation of the input code, with the consequence that a change in any embedded data completely changes the form of the obfuscated code output (whether or not other changes are made to the underlying algorithms), or a small change in one of the algorithms has the same effect (even if the embedded data is unchanged). Any knowledge an attacker might have gained in reverse engineering the first obfuscated code package (or attempting to do so) is, therefore, of no use in reverse engineering the second obfuscated code package in which the new signature key is embedded, putting the attacker back to "square one", even when the underlying change is small. With such obfuscation, a change to the embedded key (or key seeds) and/or a change to the key derivation algorithm (as applicable) is sufficient, even if no other changes are made.

The first cryptographic key may be embedded in the first obfuscated code package, or one or more first key seeds used to derive the first cryptographic key may be embedded in the first obfuscated code package. The second cryptographic key may be embedded in the second obfuscated code package, or one or more second key seeds used to derive the second cryptographic key may be embedded in the second obfuscated code package.

The second obfuscated code package may embody the same capture algorithm and the same cryptographic algorithm as the first obfuscated code package but in the second obfuscated form. Alternatively, the cryptographic algorithm of the first obfuscated code package may be a first cryptographic algorithm, and the second obfuscated code package may embody a second cryptographic algorithm different than the first cryptographic algorithm. For example, the first cryptographic algorithm may include a first key derivation algorithm configured to derive the first cryptographic key, and the second cryptographic algorithm may include a second key derivation algorithm different than the first key derivation algorithm and configured to derive the second cryptographic key.

The computer system may comprise a validation component configured to apply a validation procedure to the data item. The computer system may be configured to reject the data item if the data item is refused by the verifier or the data item is allowed by the verifier but fails the validation procedure. For example, the verification procedure may comprise a "liveness" detection procedure, a biometric authentication procedure, a document verification procedure, or any combination thereof.

The computer system may be configured to generate a response to the client device, indicating whether the data item has been rejected or accepted.

Multiple anti-spoofing safeguards may be used in combination to improve overall security. For example, a presentation attack might involve an attacker presenting a printed or displayed facial image to a device camera. A form of "liveness" test might require the user to perform a predetermined action, such as blinking or turning their head, that is captured in a video image. Another form of liveness detection might include detection of "3D-ness", to distinguish between a flat 2D surface presented to the device (such as a printed image or display screen) and a 3D human face, which can also mitigate against a replay attack based on a predetermined video presented to the device camera. For example, a computer vision or other image processing algorithm may be used to determine depth of picture elements in order to distinguish between a flat surface, such as a screen or printed photograph, or a three-dimensional object in a submitted image. One or more liveness detection components may be configured within the system to detect presence or absence of one or more liveness characteristics in a submitted data item. However, such liveness detection components can themselves be vulnerable to injection attacks, where an attacker successfully bypasses the device camera (or other capture system), and injects some predetermined image or video that exhibits the required liveness characteristic(s). In this context, the present injection attack safeguards can be used to mitigate the risk of an injection attack on a liveness component(s), and thus prevent an attacker from bypassing some other anti-spoofing mechanism(s) that is designed to protect against some other form of spoofing attack(s).

An "electronic signing" application is also considered, in which a user electronically signs a document in a signing process implemented at the client device. In this context, the data item could, for example, be an image, a user input, a file, or any other form of data item that is 'attached' to the document during the signing process in accordance with the capture algorithm. Typically, in a digital signing process, the user is presented with the document (or documents) to be signed, via a signing user interface actuable to electronically sign the document. The signing interface could, for example, be (but is not limited) to a browser interface (in a web-based signing application), a native application interface, etc. The techniques can also be used in a machine-to-machine signing context. In this context, the secure message evidences the signing of the document in a way that is robust to injection attacks and other forms of attack.

The capture algorithm of the obfuscated code package may be configured to cause the data item to be captured using a sensor (or sensors) of the client device (such as an image capture device, other biometric sensor etc.).

The capture algorithm of the obfuscated code package may be configured to cause an output device of the client device to output a randomized challenge, and a sensor device of the client device to capture the data item whilst the randomized challenge is outputted. The verifier may be configured to refuse the data item if the data item does not exhibit an expected response to the randomized challenge.

The randomized challenge may be a randomized binary sequence, and the capture algorithm of the obfuscated code package may be configured to cause a display device of the client device to output the randomized binary sequence as a sequence of light-dark display transitions.

The randomized challenge may be embedded in the obfuscated code package, or the capture algorithm may include a challenge generation algorithm configured to cause the client device to generate the randomized challenge.

The capture algorithm may be configured to obtain the randomized challenge from an external source.

The capture algorithm of the obfuscated code package may be configured to cause the client device to indicate one or more capture requirements to a user of the client device. For example, the capture algorithm may be configured to process outputs from an output device of the client device to detect when the capture requirements have been satisfied, and capture the data item responsive to determining that the capture requirements are satisfied. The one or more capture requirements may, for example, be indicated as part of a guided capture process implemented according to the capture algorithm.

The obfuscated code may be is configured to receive a code request from the client device, and transmit the obfuscated code package to the client device in response to the code request.

The computer system may comprise a server configured to receive, from a web browser or other application executed on the client device, a loader request, and provide a loader code package to the client device for running in the web browser or other application. The loader code package may be configured to generate the code request to the obfuscated code distributor when run in the web browser or other application at the client device.

The computer system may comprise a validation component configured to apply a validation procedure to the data item. The computer may be is configured to reject the data item if the data item is refused by the verifier or the data item is allowed by the verifier but fails the validation procedure.

The validation procedure may comprise at least one of: a liveness detection procedure, a biometric authentication procedure, and a document verification procedure.

The computer system may further or alternatively comprise a processing component configured to extract a piece of information from the data item (e.g. using machine learning processing).

The computer may be configured to generate a response to the client device, the response indicating whether the data item has been rejected or accepted, or the piece of extracted information.

Generating the secure message may comprise generating a data item signature based on the data item and the cryptographic key. The secure message may include the data item signature, and the verifier may be configured to verify the data item based on the data item signature.

Further or alternatively, generating the secure message may comprise encrypting the data item using the cryptographic key. The verifier may be configured to decrypt the data item and refuse the data item if decryption of the data item fails.

The cryptographic key may be embedded in the obfuscated code package.

The cryptographic algorithm may include a key derivation algorithm configured to derive the cryptographic key.

The key derivation algorithm may be configured to derive the obfuscated key based on one or more key seeds. The one or more key seeds may be embedded in the obfuscated code package, external, or a combination of embedded and external key seeds may be used.

Where a derived key is used, the system knows how the key is derived, and can use that knowledge to verify the data item.

The computer system may comprise a key generator configured to generate the cryptographic key or the one or more key seeds.

The secure message may include device and/or sensor metadata about the data item, and the verifier may be configured to use the device and/or sensor metadata to verify the data item.

The obfuscated code package may be run within an application executed on the client device, and the capture algorithm may be configured to obtain the device and/or sensor metadata via an interface of the application.

The computer system may be configured to provide a session token to the client device having a token expiration time. The computer system may be configured to verify a session token received in the secure message and reject the data item if the session token in the secure message is invalid.

The code builder may be configured to generate the or each obfuscated code package by applying code obfuscation to input code embodying the capture algorithm and the cryptographic algorithm in non-obfuscated form. The cryptographic key may be embedded in the input code, or the cryptographic algorithm may include a key derivation algorithm for deriving the cryptographic key (in non-obfuscated form initially).

The data item may be one of a set of data items presented at the client device. The set of data items may include user input, and the secure message may comprise the set of data items.

The data item may be captured, according to the capture algorithm, as part of an electronic signing process implemented at the client device.

A second aspect herein provides non-transitory media embodying an obfuscated code package, the obfuscated code the obfuscated code package configured, when run on a client device, to cause the client device to cause the client device to: capture a data item according to a capture algorithm embodied in the obfuscated code package in obfuscated form; and generate a secure message according to a cryptographic algorithm embodied in the obfuscated code package in obfuscated form, using a cryptographic key embedded in the obfuscated code package or derived by the cryptographic algorithm, the secure message comprising the data item captured at the client device.

The obfuscated code package may comprise at least one of: obfuscated script, obfuscated source code, and obfuscated machine code.

A third aspect herein provides a method of effecting secure capture of a data item at a client device, the computer system comprising: receiving, at the client device, an obfuscated code package, the obfuscated code package embodying, in obfuscated form, a capture algorithm for capturing a data item and a cryptographic algorithm for securing a captured data item; running the obfuscated code package on the client device, and thereby causing the client device to capture a data item according to the capture algorithm, and generate according to the cryptographic algorithm a secure message, using a cryptographic key of the obfuscated code package, the secure message comprising the data item captured at the client device; and transmitting the secure message for processing by a verifier.

A fourth aspect herein provides a client device comprising: a memory configured to store computer-readable instructions; and a processor coupled to the memory, the computer-readable instructions configured so as, when executed on the processor, to cause the processor to carry out the above method.

A computer system for effecting secure capture of a data item at a client device is provided, the computer system comprising: a code builder configured to generate an obfuscated code package, the obfuscated code package embodying, in obfuscated form, a capture algorithm for capturing a data item and a signing algorithm for signing a captured data item; an obfuscated code distributor configured to transmit the obfuscated code package to the client device, the obfuscated code package configured, when run on the client device, to cause the client device to capture a data item according to the capture algorithm, and generate a data item signature according to the signing algorithm based on the data item captured at the client device and a signature key embedded in the obfuscated code package or derived by the signing algorithm; and a verifier configured to receive a message comprising the data item and the data item signature, and verify the data item based on the data item signature using knowledge of the signature key.

BRIEF DESCRIPTION OF FIGURES

Particular embodiments will now be described, by way of example only, with reference to the following schematic figures, in which:

FIG. 2 shows an end-to-end flow diagram for a process of distributing a secure capture module and submitting a captured data item for verification;

FIG. 6 shows a guided image capture view rendered within a web browser interface by a secure capture module.

DETAILED DESCRIPTION

Figure 1:
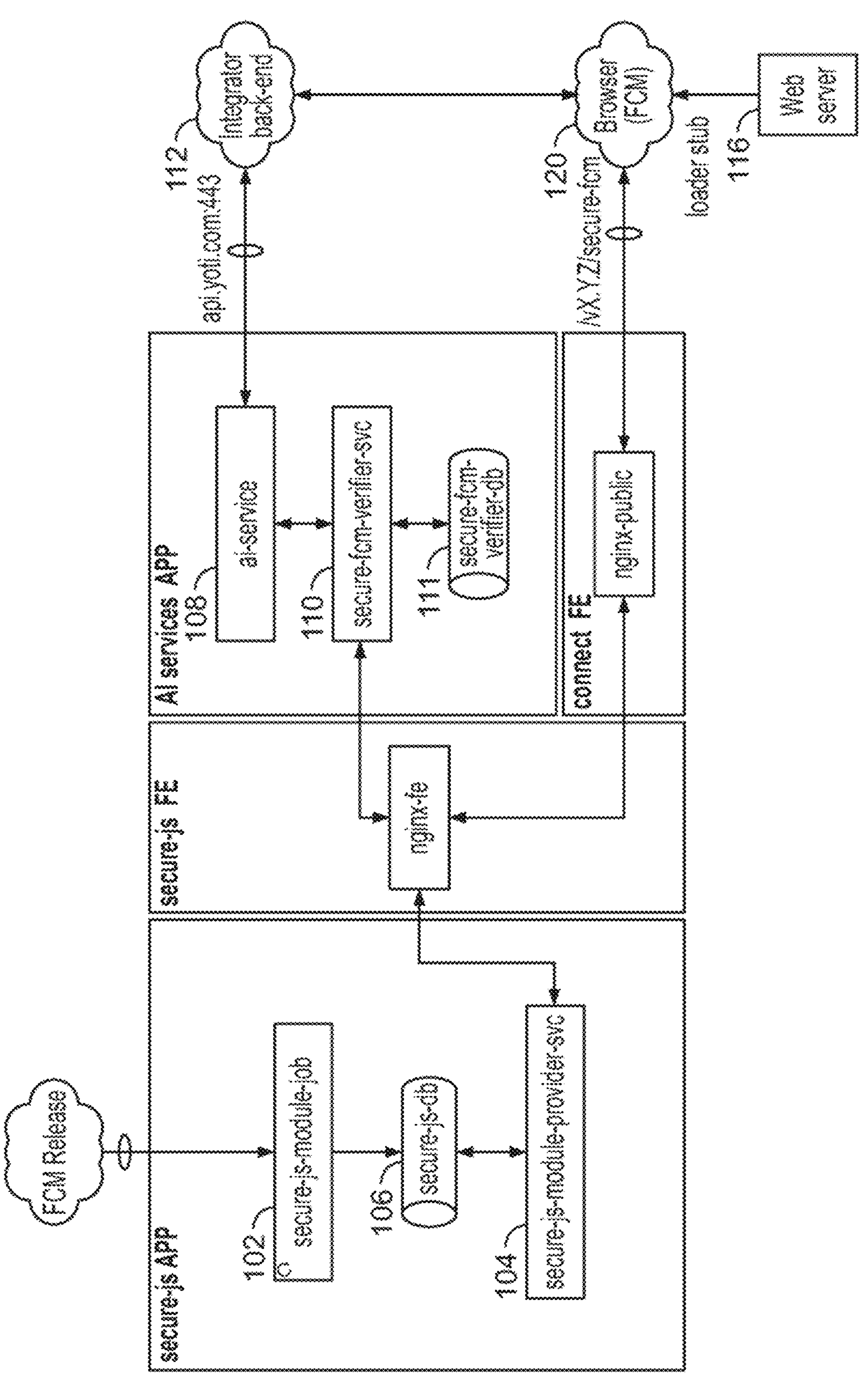
FIG. 1 shows a distributed computer system for effecting secure capture and processing of data items.

An example web application is described. A capture model is encoded as a JavaScript (JS) file(s) and deployed in the web application. The capture module is provided to a client device from a front end (FE) web service, and runs in an application (such as a web browser and/or native application) of the client device to cause a data item to be captured at the client device and submitted from the client device to a backend service for processing. The following examples consider a web browser but the description applies to any application, computer program or logic on the client device that can cause received capture module code to be run on the client device. Whilst JavaScript is considered, the description applies equally to other forms of capture module, including capture modules coded in higher-level script or source code or lower-level machine code (such as object or binary code), or any form of client-side code. The described techniques can be applied to any form of client-side code, in any format or programming language, including native application code. The client device can be any form of computing device, such as a mobile device, tablet, personal computer, television, wearable device, IoT device etc.

The capture module supports one or more data item processing functions within the backend (remote from the client device). Such functions could, for example, be implemented using machine learning (ML) technology, or more generally technology falling within the umbrella of artificial intelligence or "AI". The described examples consider a data item processing service, to which a captured data item is transmitted from the client device. The data item is contained in a payload of a request message for processing in the backend. The data item processing service generates a response to the client device comprising a result of the processing.

The term "AI Services" is used as shorthand, although in general the backend processing functions may or may not be implemented using ML or other AI technology.

The following examples consider a data item in the form of a facial image, with one or more image processing functions provided in the backend. The term "face capture module" (FCM) is used in that context. Whilst facial images are considered, the description applies equally to other forms of data item (such as other forms of image or biometric, identity data etc.). The term image refers to image data in the general sense, encompassing both static and video images.

In an authentication or liveness detection context, a response might indicate whether a facial image has been determined to satisfy a set of authentication requirement(s) or to exhibit some required liveness characteristic(s). Another application is age estimation, where the response might comprise an age attribute (such as an estimated age, or an indication of whether an age requirement is satisfied) extracted from the facial image using age estimation image processing. A processing service may be "multi-modal", determining, for example, whether a combination of authentication and liveness requirements are satisfied (e.g., the facial image might only be accepted if the user's face is recognized and a liveness test is also passed), or a combination of liveness and age requirements (e.g. the facial image might only be accepted if a liveness test is passed and some age requirement is satisfied).

Image capture and signing logic to be implemented at the client device are embodied algorithmically in the code of the FCM. The FCM is run within the browser, causing those functions to be implemented at the client device.

The JavaScript FCM is served to a web browser of the client device from a front end (FE) web service. The FCM uses a camera of the client device, such as an integrated or external webcam, to capture an image of the user and sends the captured image to the AI Services backend for processing.

In the described architecture, the developer of the web application has the flexibility to write bespoke capture logic into the JavaScript of the FCM, and is not constrained by whatever 'native' capture functions might or might not be provided by a given web browser (or other application/software). This allows the developer to optimize the capture process for a desired application or applications (such as authentication, liveness, age estimation etc.).

For example, the capture logic of the FCM may cause the client device to carry out a guided capture process, in which instructions are outputted to the user to optimize the quality of the captured data item and decrease the risk of the data item being rejected in the backend because it cannot be processed effectively. For example, the user might be guided to locate the device camera relative to their face so that the face is captured at an optimal location within the camera field of view, to optimize their background, lighting conditions etc. The capture process can be automated, providing the user with suitable instructions until a set of capture requirements is satisfied, and triggering the image capture when those requirements are satisfied.

Figure 5:
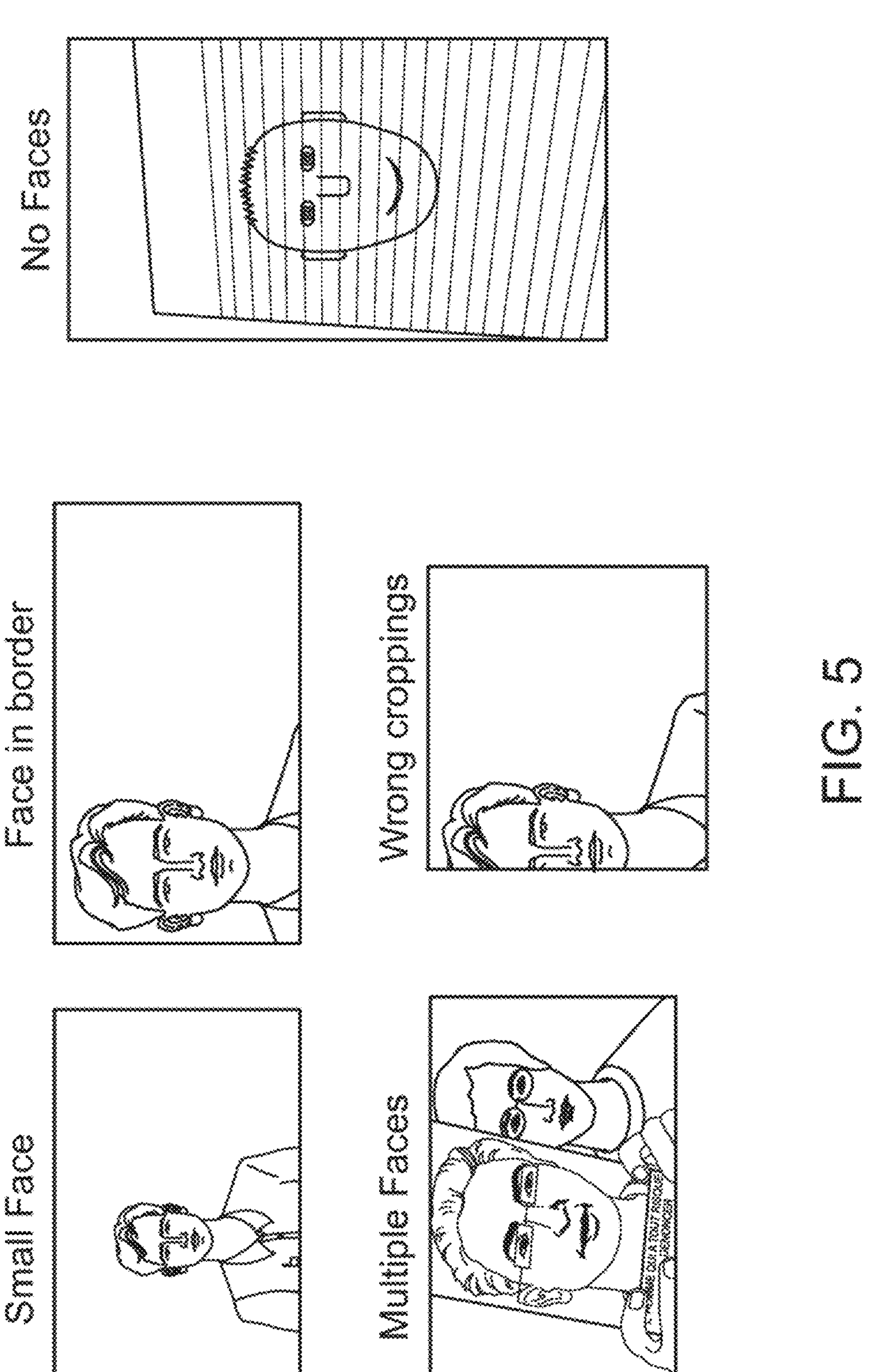
FIG. 5 shows examples of sub-optimal face images obtained through non-guided image capture.

FIG. 5 shows a selection of facial images exemplifying issues that can occur without guided image capture, such as sub-optimal placement of the face in the camera field of view (too near, too distant, not central etc.), the presence of multiple faces, partial cropping, faces being obscured etc.

FIG. 6 shows an example of a view 600 rendered within a browser interface by the FCM as part of the capture process. In this example, the capture logic causes the browser to render a face template, overlaid on a live image stream received from the device camera. The user is guided to locate their face in the camera field of view so that the face is contained within the face template, thus optimally locating and sizing the face within the captured image that is submitted to the backend. Although not shown, the use may also be provided with other instructions e.g. instructing the user to adjust brightness conditions based on a detected illumination level, to reposition the camera in response to detected glare, or to move to a location with a less noisy background.

As another example, in an "active" liveness context, the capture logic may guide the user to perform some required action or actions, whose presence is checked for in the captured facial image (active liveness denotes some explicitly required action, whereas passive liveness checks for implicit liveness characteristic(s)).

Various application programming interfaces (APIs) would typically be used to implement a deployment scenario of the kind described above. The FCM would typically interact with the browser via one or more browser APIs that expose data and functions of the browser and client device to the FCM. Various client-side APIs are available within JavaScript, allowing the FCM to receive image data from the device camera and output instructions to the user within the browser interface to guide the capture process. To allow the FCM to interface with the backend, one or more "third-party" APIs may be provided, with constructs that enable the FCM to transmit messages to AI Services and receive responses.

Three types of attack are envisaged in the above deployment scenario:

1. Replay attacks, where a valid and genuine message payload is intercepted at an API boundary and reused in future non-genuine attempts.
2. API injection attacks, where a message payload is modified with an alternative image.
3. Camera injection attacks, where a software-defined dummy camera device is instantiated and non-live images are presented to the face capture module as a live camera feed.

Mechanisms that protect against all three forms of attack are described in detail below. In brief, a protected face capture module (secure-fcm) is protected by code obfuscation and, when capturing the image payload, the face capture module will sign the payload (comprising the captured image) with a signature key embedded in obfuscated code of the JavaScript file. Here, 'embedded' is used broadly, and can refer to a key that is directly embedded in the code (e.g. at the value or values of one or more variables), or indirectly via an obfuscated key derivation algorithm. As well as hindering analysis and tampering with the intended execution flow, the code obfuscation obscures the embedded signature key. In the following examples, code obfuscation is implemented using Arxan/Digital.AI web protection applied to some initial (or 'base') code. It will be appreciated that many other forms of code obfuscation may be used. Any form of signature algorithm can be coded in the JavaScript file The following examples secure a data item (and other message data) based on a cryptographic signature. A hash of the payload is computed and a message signature is generated based on the payload hash and the signing key. This is highly efficient in terms of processing performed at the client device. Other implementations may additionally or alternatively apply "application-level" encryption using an embedded key for additional security. In either cases, one or more (further) layers of encryption may be used (for example, the message may be transmitted using TLS or other secure protocol). Whilst the following examples are described in terms of a message signature derived from a message payload, the description applies equally to implementations in which the payload is additionally or alternatively encrypted using an embedded encryption key.

The message payload contains an image file (encoded in any manner), camera metadata, device metadata, a session token and a secure-fem version identifier.

To prevent extraction and re-use of the embedded signature key, this key is rotated on a regular basis. Without obfuscation, it would be more straightforward for an attacker to extract the key and generate valid signatures outside of the FCM. This, in turn, could form the basis of an API injection attack, where an attacker generates or modifies a message with a different image and generates a new valid message signature with the extracted signature key. However, the code obfuscation presents a significant barrier to key extraction. If the key is expired after a period (e.g. of a number of hours), the attacker has at most that amount of time to reverse-engineer the obfuscated code and extract the embedded key. Moreover, the obfuscation process is highly non-linear, in the sense that even a small change to the base code causes a dramatic change in the obfuscated output. When a new key is generated and embedded in a future code package, the form of the obfuscated code will be completely changed compared to the previous version, putting an attacker back to "square one": if an attacker is able to eventually reverse-engineer an earlier version of the secure FCM, its embedded signature key is highly unlikely to still be valid; moreover, the knowledge they have gained in doing so will be of no use in reverse-engineering a later version, because the form of the obfuscated code will now be completely different.

The signature key can, in the simplest case, be embedded as a value assigned to a variable of the obfuscated code. In this case, key rotation does not require any further modification to the code, beyond the substitution of the new key. A possible source of vulnerability is that a sophisticated attacker might be able to infer or guess the signature key from the obfuscated code, without full reverse-engineering.

For additional security, rather than embedding the signature key 'directly', the signature key may be embedded indirectly as a piece of derivation logic coded in the capture module and one or more key seed values. The key seed values can be embedded in the obfuscated code itself, external to it, or a combination of embedded and external seeds may be used. External seed(s) are viable because even an attacker in possession of the external seed(s) cannot make use of them if they do not know the key derivation algorithm. In that case, the key derivation logic is run as part of the secure-sfm, to reconstruct the signing key from the seed key seed value(s). The key derivation algorithm can be altered e.g. every time the signing key is rotated or at any suitable frequency, so that any knowledge of the earlier key derivation process obtained through reverse-engineering of an earlier version becomes redundant before it can feasibly be extracted.

A signature key itself may remain valid (non-expired) for an additional interval after a key rotation, to address a situation in which a version of the secure-fem is obtained shortly before it expires.

The session token is also contained within the signed message payload. Once the session token has expired, the message will be rejected. The session token is effective at preventing replay attacks, in which an attacker attempts to submit a previous genuine message payload and signature. The session token is a short-life token (e.g. that expires within a period of the order of minutes, seconds or less), and could also be a "one-time" token that is expired within the backend on first use. Once the token has expired, a replay attack is impossible, and an attacker cannot alter the session token in a genuine message payload without invalidating the message signature.

Figure 7:
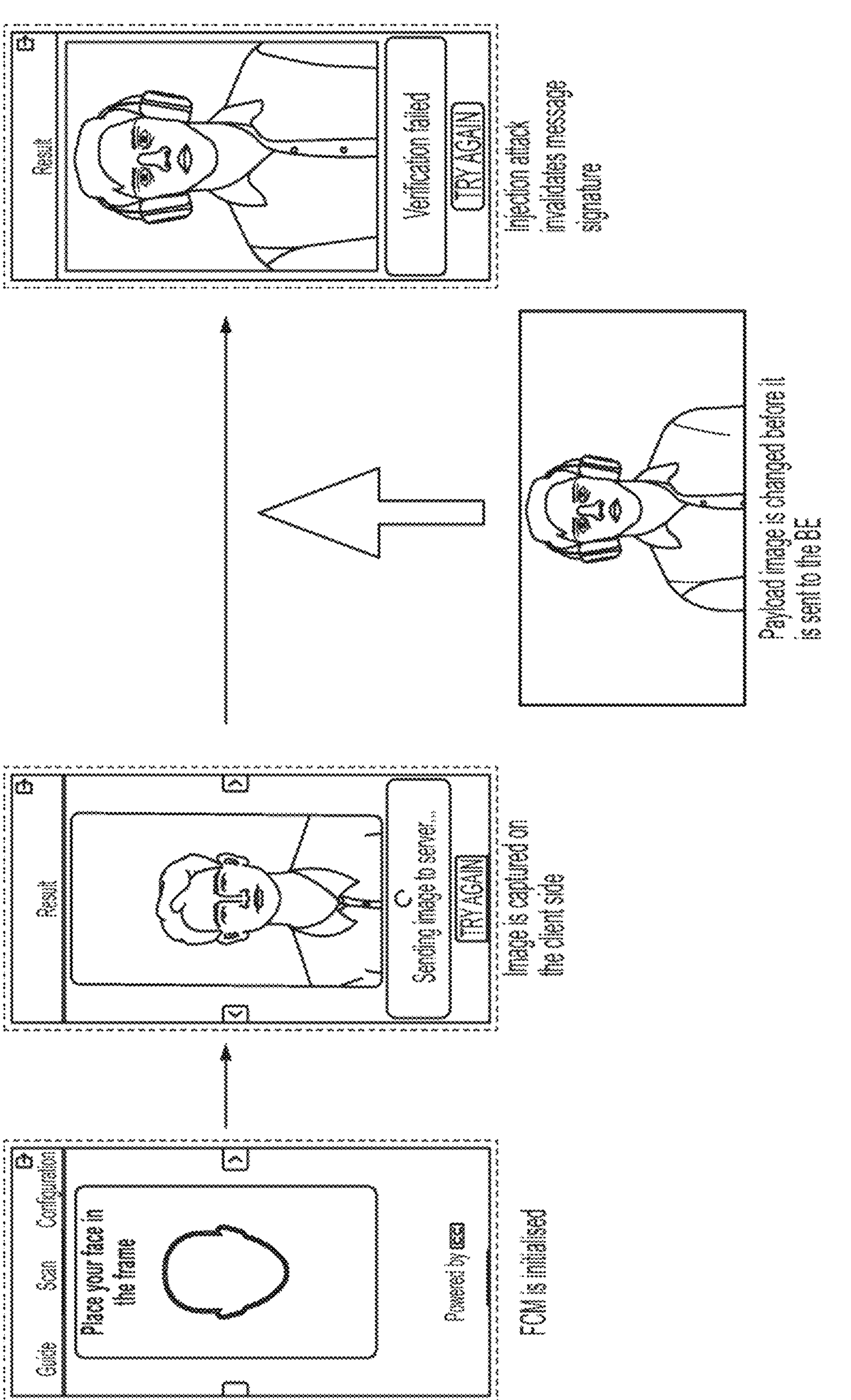
FIG. 7 provides an overview of an image injection attack and a signature mechanism that protects against such attacks.

FIG. 7 provides a high-level overview of an API injection attack. A genuine image is captured client side and sent in a message, but the message is intercepted before it reaches the backend. An attacker substitutes a different image in the message payload and forwards the message on to the back end. Without safeguards to protect against such attacks, the backend has no way of knowing that the image has been substituted. However, in the present system, the API injection attack invalidates the message signature and the attack fails as a result.

FIG. 1 shows a schematic block diagram of functional components implemented within a distributed computer system. A backend system 100 is shown to comprise a code builder 102 and an obfuscated code distributor 104, which cooperate to provide the secure-fcm to a browser 120 running on a client device.

To facilitate regular signature key rotation, the FCM is split into two parts: a non-protected (non-obfuscated) loader stub that is published publicly via a package manage, and the protected module (secure-fcm) whose main functionality is capture and sign images (that is, encoding the capture and signing algorithms, and the embedded signing key) that is protected by code obfuscation. The code builder 102 is responsible for building the protected module, with a newly-generated signature key that is embedded using a time-triggered job. The secure-fem is stored in a code database 106.

A web server 116 provides the loader stub to the browser 120, in response to a loader request.

In operation, the loader stub (fcm npm package) instigates an API call to the obfuscated code distributor 104 to obtain the protected module, and runs the code of the protected module within the browser 120. A JavaScript front end is provided to facilitate communication between the loader stub and the backend. This API call also returns a short-lived session token. The secure-fem module is responsible for capturing the image from the camera, and creating a signature from the payload using the embedded signature key. The payload format also includes the session token, as well as a device metadata and camera metadata field detailing the camera capabilities visible to the face capture module.

The camera metadata is an optional safeguard that can be used within the backend to support "fake" camera detection (providing some mitigation against camera injection attacks). The camera and device metadata are obtained by interrogating the browser 120 and can be useful in detecting fake cameras. For example, camera metadata provided by the browser that indicates a source of the facial image as a "virtual" or "broadcast" camera (or similar) is indicative of a camera injection attack. The device metadata could, for example, include details of the browser 120 itself (e.g. a name and version), which can be useful in determining the reliability of the camera metadata.

The payload also contains a version field, to allow for continuing protocol upgrades.

The obfuscated code distributor 104 has a public endpoint to request the latest version of the secure-fem, called from the JavaScript front end.

Once a facial image has been captured, the browser 120 transmits the captured image in a message to an integrator backend server 112. Messages submitted in this way arrive at an AI coordinator service 108. On receipt of a message, the coordinator service 108 propagates the verification to a verifier 110, which in turn verifies the message signature against the message payload. The verifier 110 has an internal endpoint called from the AI coordinator service 108 for this purpose.

In checking the signature from the FCM result, the verifier requests information from the obfuscated code distributor 104 about the signature key for the incoming request using the version identifier in the payload. A cache with the key expiration date may be provided in order to improve the performance. Requested keys are stored in a key database 111 so that they do not need to be re-requested if the verifier 110 restarts.

The verifier also determines whether the session token is valid. This can be instigated via another request as the keys are cached.

FIG. 2 shows an end-to-end flow diagram for implementing a secure capture model with rotating keys. The steps of FIG. 2 are described below.

S202: The code builder 102 rotates the signing key periodically (e.g. every 12 hours). On each key refresh, a new signature key, having some set key expiration time, is obtained and embedded in a base code package, and the base code package is transformed via code obfuscation to generate a new obfuscated code package embodying the secure-fcm. In RSA implementations, the signature key is a private key of a public-private key pair. A message signature generated with the private message key is verifiable using the public key counterpart (verification key). If a symmetric signing protocol is used, the signing key and verification key are one and the same. Whichever protocol is used, knowledge of the signing key (e.g. the key itself or its public counterpart) is used in the backend to verify the signature. A new FCM release (a change to the base code) also triggers the generation of a new obfuscated code package. The new obfuscated code package and associated public key are passed from the code builder 102 to the obfuscated code distributor 104.

S204: a secure-fcm request to the obfuscated code distributor 104 is instigated by the client browser 120 via the JavaScript front end. The secure-fem request is instigated by the loader stub 201 running within the client browser 120.

S206: In response to the secure-fem request, the obfuscated code distributor 104 generates a valid session token and returns a response to the client browser 102 comprising the session token and the obfuscated code package containing the latest version of the secure-fcm.

S208: The client browser 120 loads the current secure-fcm, which in turn captures a facial image via the device camera, and generates a secure request. The secure request comprises a payload and a message signature generated by signing a hash of the payload with the signature key embedded in the obfuscated code of the current secure-fcm. The payload contains the captured image, together with a key version identifier, device metadata, camera metadata and the session token obtained with the secure-fcm, S210: The secure request is transmitted from the client browser 120 to the integrator backend server 112.

S212: The AI secure request is passed from the integrator backend server 112 to the AI service coordinator 108.

S214: The AI service coordinator 108 passes the message signature and the message payload to the verifier 110 for verification.

S216: The verifier 110 sends a token verification request to the obfuscated code distributor 104 containing the session token received in the message payload. The verifier 110 checks the key database 111 for a verification key matching the key version identifier. If none is found, the verification key is also requested from the obfuscated code distributor 104.

S218: The obfuscated code distributor 104 validates the session token and returns a response to the verifier 100 indicating whether or not the session token is valid. The public key corresponding to the key version identifier is also returned, if requested, and stored in the key database 111. Assuming the session token is valid, the verifier 110 uses the public key to verify the message signature against the received message payload.

S220: The verifier 110 returns a verification response to the AI services coordinator 108 indicating success (the session token and the message signature are valid) or failure (the session token is invalid or the message signature is invalid). In some implementations, the verifier 110 additionally verifies the device and camera metadata provided in the secure request (see below), and in that case, the verification may also fail if the metadata is invalid. Assuming the verification is successful, the AI service coordinator 108 causes one or more core AI processing functions to be applied to the facial image (such as facial verification, facial recognition, liveness detection, age estimation etc., or any combination thereof). Certain AI functions (such as authentication or liveness) could also result in a pass/fail type outcome. A data item may be refused by the verifier 110 (because the message signature or the session token is invalid), or allowed by the verifier (valid signature and token) but nevertheless rejected (e.g. because it fails a liveness test or authentication requirement). If a data item is allowed by the verifier 110, and meets any other requirement (s) imposed within AI services, the data item is accepted.

S222: A response is returned from the AI services coordinator 108 to the integrator backend server 112. If the verifier 110 has returned an error, the response to the integrator backend server 112 will also indicate a verification error. If the verification was successful, the response contains the results of the AI processing (such as a liveness result and estimated age attribute, which in some cases could indicate if the data item has been accepted or rejected in the above sense).

S224: A final response is sent from the integrator backend server 112 to the client web browser 120.

Figure 3:
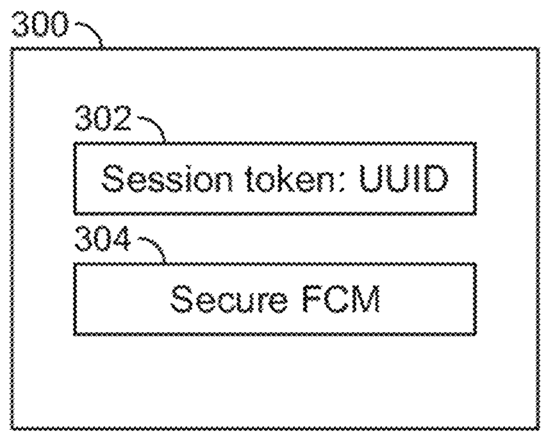
FIG. 3 shows a secure capture module response message sent to a client device.

FIG. 3 shows a response 300 (or responses) sent to the client device at step S206, in order to provide the client device with the requested capture module. The response 300 contains a session token 302 in the form of a universally unique identifier (UUID) and the current version of the secure-fem 304 embodied as an obfuscated code package.

Figure 4:
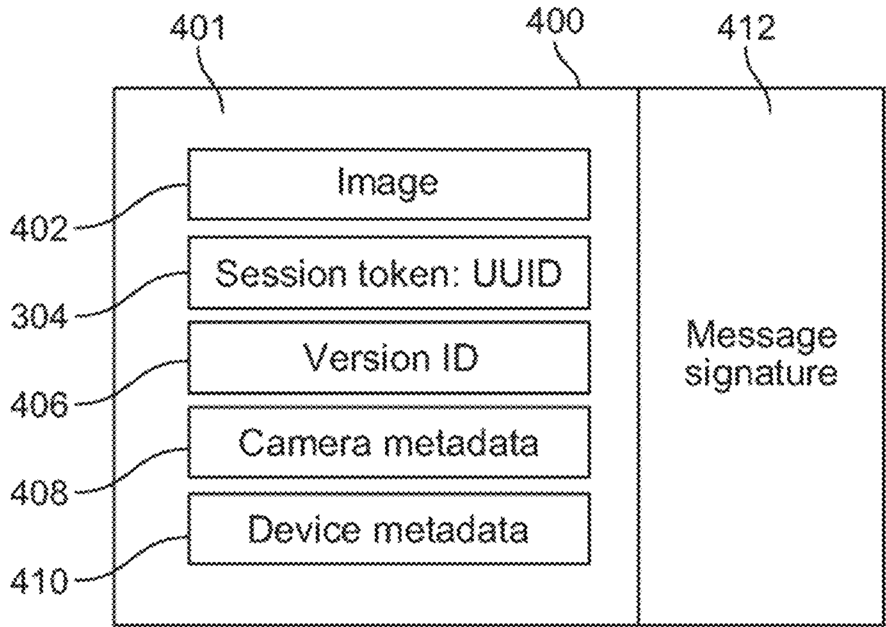
FIG. 4 shows a service request sent from a client device to a backend.

FIG. 4 shows an AI services request 400 sent at step S210. A payload 401 of the request 400 comprises the captured image 402, the session token 304 and a version identifier 406, together with device and camera metadata 408, 410. A message signature 412 is generated by signing the payload 401 with the embedded signature key, and the payload cannot be altered without invalidating the message signature 412.

So far, the focus has mainly been replay and API injection attacks. A camera injection attack (#3 above) relies on successfully intercepting the camera feed before it reaches the secure-sfm 302, and replacing it with a new feed from some virtual camera module. Checks can be implemented within the secure FCM 302 to guard against this, but it is at least theoretically possible to fool the secure SFM with a sufficiently realistic camera feed.

The verification on the device and camera metadata protects against camera injection attacks. In this case, the verifier 110 processes the device and camera metadata for any indication of a camera (or other sensor) injection attack, such as an indication of a "virtual" camera or sensor. As noted, the device metadata data could contain browser details, which can be used to interpret the camera metadata. The message could also be rejected if a particular browser is untrusted or out of date, or if the device metadata indicates presence of a modified browser.

Protection against sensor injection attacks can alternatively or additionally be provided via a "randomized challenge". In an extension of the above techniques, the capture logic of secure-fcm 302 causes a randomized challenge to be outputted at the client device in a manner that is detectable in the captured face images. For example, the randomized challenge could be a sequence of light-dark transitions that are rendered via a display of the client device, and captured in a video facial image as reflections from the user's face. An additional check is then implemented e.g. in the verifier 110 to check that the sequence of reflections captured in the video image matches the randomized challenge.

In principle, an attacker with knowledge of the randomized sequence could design a sophisticated virtual camera module that can simulate a sequence of reflections satisfying the randomized challenge in software and generate synthetic image data capturing the simulated reflections.

To make this infeasible, the randomized challenge can be embedded in the code of the secure-fcm in the same way as the signature key, making it equally hard to extract.

Ideally, the randomized challenge should change every time the capture process is performed, or at least with a relatively high frequency. One way to achieve this (without having to generate new obfuscated code in response to every secure-fem request) is for the capture logic of the secure-fcm to include a pseudo-random number generator that generates a randomized sequence as a deterministic but highly unpredictable function of some specified seed input. The seed input could, for example, be provided with the session token (or be all or part of the session token itself). In this case, even if the seed input is known, it is infeasible for an attacker to obtain the randomized challenge before the session token expires without reverse-engineering the obfuscated code.

Alternatively, the secure-fem may obtain the randomized challenge from an external source, such as an address (e.g. URL) contained in the obfuscated code. In this case, the client sends a challenge request to the external source and obtains the challenge in a response.

Metadata analysis and/or the projection and capture of a sequence pattern or other randomized challenge each benefit from the code obfuscation, as the code obfuscation provides a barrier to an attacker seeking to learn about the system in an attempt to defeat it.

In browser-based applications, an attacker generally has greater control of the operative system, browser and debugging capabilities. The described techniques are beneficial in that context Nevertheless, whilst a web application is considered above, the techniques have broader benefits and can be applied in other application contexts, including non web-based applications. For example, the capture module could be code of a "native" application that is executed on the client device. For example, the capture module could form part of the native code itself (at the point the application is installed), or the capture module could be other code (e.g. script) that is obtained in a manner similar to a web application (effectively delivering a web application or similar functions to a web-capable native application in place of the browser 120). The secure-fem could take other obfuscated forms, such as source code that is compiled within the browser 120 or other application using 'just-in-time' techniques and the like.

An "electronic signing" application is also considered, in which a user electronically signs an electronic document (or documents) in a signing process implemented at the client device. In this context, the data item could, for example, be a user input, a file or supporting document (e.g. an identity document or non-identity document), an image (e.g. user image, document image etc.), biometric (image or non-image), or any other form of data item that is 'attached' to the electronic document during the signing process. In this case, the capture algorithm of the obfuscated code package determines how the supporting data item(s) are captured at the client device. Typically, in a digital signing process, the user is presented with the electronic document (or documents) to be signed, and a signing interface via which the document may be reviewed, and which is actuable to electronically sign the document. The term document is used broadly and covers any form of data that is electronically signed in this manner. One or more data items may be captured at the client device as part of the signing process for submission with the signed document. In this context, the captured data item could, for example, be an attribute of the user that is captured as part of the signing process, such as an image/biometric, identity datum etc., or text or other user input entered by the user at the client device. For example a facial image of the user may be captured as part of the signing process to provide supporting evidence. Captured user input could, for example, be a 'typed' signature (e.g. of the form "/John Doe/") that a user inputs at the client device (or which the user has previously inputted), an 'electronic ink' signature (e.g. drawn by the user on a touchscreen or using stylus etc.), a signature image, a qualified electronic signature etc. As another example, the data item could take the form of a supporting document or file, such as an identity document, a bank statement, or a completed paper form that the user attaches to the electronic document to be signed. The electronic signing process could be carried out within a native application environment, or delivered in a web application. When a web-based or native app-based e-signing application offers the option of camera image capture identity verification or digital identity proofing within the signature process, the present techniques protect against injection attacks on attached data item(s), such as user images/biometrics, document images/files.

It will be appreciated that the examples described above are illustrative rather than exhaustive. The client device can take various forms, including a mobile device, personal computer, wearable device, media controller etc. The browser 120 or other application is embodied as program instructions stored in memory of the client device and executed on a processor (e.g. CPU) of the client device. References to a processor include multiple processors. FIGS. 1 and 2 merely depict one example deployment in which the present techniques can be implemented, which is not exhaustive. In general, the functional backend components 102-110 and the web server 116 of FIG. 1 can be implemented in one or more computing devices at one or more locations within a localized or distributed computer system. A computer system comprises computing hardware which may be configured to execute any of the steps or functions taught herein. The term computing hardware encompasses any form/combination of hardware configured to execute steps or functions taught herein. Such computing hardware may comprise one or more processors, which may be programmable or non-programmable, or a combination of programmable and non-programmable hardware may be used. Examples of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable through circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

The invention claimed is:

1. A computer system for effecting secure capture of a data item at a client device, the computer system comprising one or more processors configured with computer-executable instructions to:

generate an obfuscated code package, the obfuscated code package embodying, in obfuscated form, a capture algorithm for capturing a data item and a cryptographic algorithm for securing a captured data item;

transmit the obfuscated code package to the client device, the obfuscated code package configured, when run on the client device, to cause the client device to capture a data item according to the capture algorithm, and generate a secure message according to the cryptographic algorithm, using a cryptographic key embedded in the obfuscated code package or derived by the cryptographic algorithm, the secure message comprising the data item captured at the client device; and receive the secure message comprising the data item, and verify the data item using knowledge of the cryptographic key.

2. The computer system of claim 1, wherein the cryptographic key has an associated expiration time, wherein the one or more processors are further configured to determine whether the cryptographic key has expired, and refuse the data item if the cryptographic key has expired or the secure message is invalid.

3. The computer system of claim 1, wherein the cryptographic key is a first cryptographic key and the obfuscated code package is a first obfuscated code package, wherein the one or more processors are further configured to generate a second obfuscated code package;

wherein the first obfuscated code package has a first obfuscated form that is dependent on the first cryptographic key, and the second obfuscated code package has a second obfuscated form that is dependent on a second cryptographic key thereof, such that the second cryptographic key is not derivable from the first obfuscated form of the first obfuscated code package.

4. The computer system of claim 3, wherein the cryptographic key has an associated expiration time, wherein the one or more processors are further configured to determine whether the cryptographic key has expired, and refuse the data item if the cryptographic key has expired or the secure message is invalid, wherein the second cryptographic key has a later expiration time than the first cryptographic key.

5. The computer system of claim 3, wherein;

first cryptographic key is embedded in the first obfuscated code package, or one or more first key seeds used to derive the first cryptographic key are embedded in the first obfuscated code package;

the second cryptographic key is embedded in the second obfuscated code package, or one or more second key seeds used to derive the second cryptographic key are embedded in the second obfuscated code package; and the second obfuscated code package embodies the same capture algorithm and the same cryptographic algorithm as the first obfuscated code package but in the second obfuscated form.

6. The computer system of claim 3, wherein the cryptographic algorithm of the first obfuscated code package is a first cryptographic algorithm, and the second obfuscated code package embodies a second cryptographic algorithm different than the first cryptographic algorithm.

7. The computer system of claim 6, wherein the first cryptographic algorithm includes a first key derivation algorithm configured to derive the first cryptographic key, wherein the second cryptographic algorithm includes a second key derivation algorithm different than the first key derivation algorithm and configured to derive the second cryptographic key.

8. The computer system of claim 1, wherein the capture algorithm of the obfuscated code package is configured to cause:

an output device of the client device to output a randomized challenge, and a sensor device of the client device to capture the data item whilst the randomized challenge is outputted;

wherein the one or more processors are further configured to refuse the data item if the data item does not exhibit an expected response to the randomized challenge.

9. The computer system of claim 8, wherein the randomized challenge is a randomized binary sequence, the capture algorithm of the obfuscated code package configured to cause a display device of the client device to output the randomized binary sequence as a sequence of light-dark display transitions.

10. The computer system of claim 8, wherein the randomized challenge is embedded in the obfuscated code package, or the capture algorithm includes a challenge generation algorithm configured to cause the client device to generate the randomized challenge.

11. The computer system of claim 8, wherein the capture algorithm is configured to obtain the randomized challenge from an external source.

12. The computer system of claim 1, wherein the capture algorithm of the obfuscated code package is configured to cause the client device to indicate one or more capture requirements to a user of the client device.

13. The computer system of claim 1, wherein the cryptographic key is embedded in the obfuscated code package.

14. The computer system of claim 1, wherein the cryptographic algorithm includes a key derivation algorithm configured to derive the cryptographic key.

15. The computer system of claim 1, wherein the secure message includes device and/or sensor metadata about the data item, and the one or more processors are further configured to use the device and/or sensor metadata to verify the data item.

16. The computer system of claim 15, wherein the obfuscated code package is run within an application executed on the client device, and the capture algorithm is configured to obtain the device and/or sensor metadata via an interface of the application.

17. The computer system of claim 1, configured to provide a session token to the client device having a token expiration time, wherein the computer system is configured to verify a session token received in the secure message and reject the data item if the session token in the secure message is invalid.

18. The computer system of claim 1, wherein the data item is captured, according to the capture algorithm, as part of an electronic signing process implemented at the client device.

19. Non-transitory media embodying an obfuscated code package, the obfuscated code package configured, when run on a client device, to cause the client device to cause the client device to:

capture a data item according to a capture algorithm embodied in the obfuscated code package in obfuscated form; and generate a secure message according to a cryptographic algorithm embodied in the obfuscated code package in obfuscated form, using a cryptographic key embedded in the obfuscated code package or derived by the cryptographic algorithm, the secure message comprising the data item captured at the client device.

20. A method of effecting secure capture of a data item at a client device, the method comprising:

receiving, at the client device, an obfuscated code package, the obfuscated code package embodying, in obfuscated form, a capture algorithm for capturing a data item and a cryptographic algorithm for securing a captured data item;

running the obfuscated code package on the client device, and thereby causing the client device to capture a data item according to the capture algorithm, and generate according to the cryptographic algorithm a secure message, using a cryptographic key of the obfuscated code package, the secure message comprising the data item captured at the client device; and transmitting the secure message for processing by a verifier.

* * * * *